(12) United States Patent
Matsuura et al.

(10) Patent No.: US 6,641,879 B1
(45) Date of Patent: Nov. 4, 2003

(54) ACRYLIC GLOVE WITH INTERNAL COATING

(75) Inventors: Ai Matsuura, Kobe (JP); Yoshiaki Miyamoto, Kobe (JP); Atsuko Ochi, Akashi (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/549,526

(22) Filed: Apr. 14, 2000

(30) Foreign Application Priority Data

| Apr. 14, 1999 | (JP) | 11-107066 |
| Jul. 7, 1999 | (JP) | 11-193476 |
| Oct. 28, 1999 | (JP) | 11-307610 |

(51) Int. Cl.$^7$ .............................. C08J 5/02
(52) U.S. Cl. .................. 428/35.7; 2/161.7; 2/168; 428/36.8; 428/147; 428/143; 428/144; 428/492; 428/495; 428/496; 428/507; 428/520; 428/523
(58) Field of Search .............. 428/35.7, 36.8, 428/147, 143, 144, 492, 495, 496, 507, 520, 523; 2/161.7

(56) References Cited

U.S. PATENT DOCUMENTS

| 3,411,982 | A | | 11/1968 | Kavalir et al. ............... 161/242 |
| 4,082,862 | A | | 4/1978 | Esemplare et al. .......... 427/133 |
| 5,143,971 | A | * | 9/1992 | Stanislawczyk ............. 524/833 |
| 5,284,157 | A | * | 2/1994 | Miller et al. ................. 128/844 |

FOREIGN PATENT DOCUMENTS

| EP | 0264871 A2 | 4/1988 |
| EP | 0511681 A1 | 11/1992 |
| EP | 0 486 183 B1 * | 8/1996 |
| EP | 0906731 A2 | 4/1999 |
| JP | 4119102 | 4/1992 |
| JP | 6014 | 1/1994 |
| JP | 283522 | 10/1996 |
| JP | 337910 | 12/1996 |
| JP | 161527 | 3/1999 |
| WO | WO88/08311 | 11/1988 |

OTHER PUBLICATIONS

Database WPI, Section Ch. Week 199710, Derwent Publications Ltd., London, GB; AN 1997–103933, XP002189569 & JP 08 337910 A (St. Kagaku KK), Dec. 24, 1996 (abstract).

Database WPI, Section PQ, Week 199920, Derwent Publications Ltd., London, GB; AN 1999–233351, XP002197594 & JP 11 061527 A (Hani Chem Ltd), Mar. 5, 1999.

* cited by examiner

*Primary Examiner*—Sandra M. Nolan
(74) *Attorney, Agent, or Firm*—Birch, Stewart, Kolasch & Birch, LLP

(57) ABSTRACT

An acrylic resin glove is made of a film having a crosslinked structure, formed of an acrylic resin emulsion, and an internal surface treating agent for an acrylic resin glove, is composed of an acrylic resin emulsion, and at least one organic filler selected from the group consisting of methacrylic resin micro-particles, polyolefinic resin micro-particles and cellulose beads, each having an average particle diameter within a range from 3 to 10 $\mu$m, the content of said organic filler being within a range from 2 to 8% by weight based on the total weight. The acrylic resin glove is superior in fitting and detaching properties and in washing resistance while maintaining required mechanical characteristics. The internal surface treating agent is used to obtain an acrylic resin glove having the above-described characteristics by forming a film of this treating agent on the internal surface of the acrylic resin glove, thereby to improve the lubricity of the internal surface of the glove.

11 Claims, No Drawings

ACRYLIC GLOVE WITH INTERNAL COATING

BACKGROUND OF THE INVENTION

The present invention relates to an acrylic resin glove which is superior in fitting and detaching properties, and a treating agent which is used to improve the lubricity of the interior surface of the glove.

Gloves which have hitherto been applied widely to the filed of household, working, inspection, and operation are classified roughly into a glove made of a rubber and a glove made of a vinyl chloride resin.

Among these gloves, those made of a natural rubber (NR) and a synthetic rubber such as acrylonitrile-butadiene rubber (NBR), styrene-butadiene rubber (SBR) or the like have such a problem that adhesion with hands is enhanced due to its high stickiness and a gummy feel occurs, thereby making it impossible to smoothly fit or detach the glove. In addition, a glove made of the natural rubber (NR) causes allergic conditions due to a protein contained in the natural rubber.

On the other hand, a glove made of a vinyl chloride resin having a large modulus is superior in fitting and detaching properties of the glove, but causes generation of dioxine on disposal and incineration. With the enhancement of the interest in environmental problems, use of the glove has been limited.

Therefore, it has been desired to obtain a glove having excellent fitting and detaching properties while using a material other than the vinyl chloride resin. There have been suggested various gloves, for example, glove wherein a lubricant resin layer is provided on the interior surface of a conventional rubber glove body (Japanese Unexamined Patent Publication (Kokai) No. 11-61527), glove wherein a dry film composed of a film of a modified urethane emulsion and a surface treating layer of a synthetic resin solution containing a fluorine surfactant is provided on the interior surface of a conventional rubber glove body (Japanese Unexamined Utility Model Publication (Kokai) No. 6-4014), glove whose internal surface is coated with an ionic polyurethane and a blend of said polyurethane and the other polymer to impart the lubricity (Japanese Patent No. 2677850).

However, the gloves disclosed in the above Patent Publications require a step of forming a new film by dipping or application and a laminating step by coating, thereby to cause a problem such as complicated production processes, resulting in high production cost. It is also impossible to solve such a problem that fitting and detaching properties are inferior than those of the glove made of the vinyl chloride resin.

Japanese Unexamined Patent Publication (Kokai) No. 8-283522 discloses, as a glove made of the material other than the vinyl chloride resin, a glove obtained by forming a composition comprising a latex of a copolymer of a unsaturated nitrile having a carboxyl group in a molecule and a conjugated diene, and a polyurethane resin emulsion. However, the invention described in the above Patent Publication has an object of improving the oil resistance and solvent resistance, and the fitting and detaching properties of the glove according to the present invention are insufficient as compared with the glove made of the vinyl.

As a conventional method of imparting the lubricity to the interior surface of the glove, there has been made a trial of subjecting to a dusting treatment of adhering lubricants such as talc powder, mica powder, starch, etc. to the interior surface of the glove, or treating the surface with chlorine or implanting the surface with hairs, thereby to reduce a friction coefficient of the surface (i.e. adhesion) and to enhance the lubricity of the interior surface of the glove.

However, the lubricant adhered and hair implanted on the interior surface of the glove are liable to remove from the glove body by repeated use and washing and, therefore, the effect of enhancing the lubricity can not be maintained for a long period. There is a fear that the lubricant is adhered on hands after detaching the glove, thereby to cause contamination of the environment. Therefore, it can not be used in an operation where dust must be drastically avoided, for example, production of electronic parts. There is also a fear that some lubricant causes allergic conditions by touching directly with the skin of hands.

When treating with chlorine, even if only the internal surface of the glove is treated, the external surface is also lubricated, thereby to cause problems such as low workability on fitting of the glove and discoloring of the glove and discoloration of the glove. Upon wrestling with the problems that have attracted special interest recently, persons are liable to avoid products containing chloride. Thus, the treatment with chlorine has been avoided for such a reason.

Therefore, there has recently been made an attempt of improving the lubricity of the interior surface to obtain excellent fitting and detaching properties while keeping the workability on fitting of the glove by providing a layer containing micro-particles on the interior surface of the glove, thus suggesting various interior surface treating agents and methods of treating the interior surface for formation of the above layer as well as various gloves whose internal surface is treated.

Japanese Unexamined Patent Publication (Kokai) No. 8-337910 discloses a NBR glove comprising an acrylic resin layer containing inorganic micro-particles such as silica powders on the interior surface of a glove base composed of an acrylonitrile-butadiene rubber (NBR) latex. Japanese Unexamined Patent Publication (Kokai) No. 4-119102 discloses a glove made of a vinyl chloride resin wherein a layer of a synthetic resin emulsion containing an organic filler is provided to enhance the lubricity of the interior surface.

However, the gloves thus obtained still have insufficient fitting and detaching feels.

Since the NBR glove and glove made of the vinyl chloride resin do not have good adhesion with an acrylic resin layer, there is a fear that an acrylic resin layer is peeled off during the use for a long period.

Japanese Unexamined Patent Publication (Kokai) No. 8-337910 describes that organic micro-particles of the vinyl chloride resin can be used in place of inorganic micro-particles as micro-powders to be added for improving the lubricity of the acrylic resin layer. However, when using vinyl chloride, there is a fear that dioxine is generated on disposal as described above. Furthermore, the invention described in Japanese Unexamined Patent Publication (Kokai) No. 4-119102 relates to a glove made of a vinyl chloride resin and this glove has a problem that the oil resistance and mechanical strength of the glove itself are poor and dioxine is generated on disposal.

The present inventors have found an advantage that a glove made of an acrylic resin has a large modulus and does not cause environmental pollution on disposal, like a bag made of vinyl chloride, in the present invention, thus succeeding in production of the glove. However, a conventional treating agent is not suited for use as an interior surface treating agent for the glove made of an acrylic resin. That is, a conventionally known interior surface treating agent for glove contains a latex as a base and is not suited for practical use because of its low adhesion to the glove made of the acrylic resin.

When only an acrylic resin layer disclosed in Japanese Unexamined Patent Publication (Kokai) No. 8-337910 is formed on the surface of the glove, sufficient lubricity can not be obtained and a rough feel occurs because of the addition of micro-powders. On the other hand, when a layer of a synthetic resin emulsion disclosed in Japanese Unexamined Patent Publication (Kokai) No. 4-119102 is provided on the interior surface of the acrylic resin glove, there is a problem that the layer is easily peeled off because of low adhesion between the both.

Accordingly, a practical interior surface treating agent capable of improving the lubricity of the interior surface of the acrylic resin glove has never been developed.

SUMMARY OF THE INVENTION

Therefore, an object of the present invention is to provide an acrylic resin glove which has physical properties, that are identical or superior to those of a glove made of a vinyl chloride resin, such as and detaching properties, and which does not cause generation of dioxine upon disposal and incineration.

Another object of the present invention is to achieve the above object and to provide a glove which is superior in detergent resistance while maintaining mechanical characteristic of a film.

Still another object of the present invention is to provide an interior surface treating agent used to make fitting and detaching properties of an acrylic resin bag excellent, and to provide an acrylic resin glove which is superior in fitting and detaching properties by using the interior surface treating agent.

The present inventors have intensively studied to solve the above problems. As a result, the present inventors have succeeded in providing a glove which has physical properties, that are identical or superior to those of a glove made of a vinyl chloride resin, particularly fitting and detaching properties, and which does not cause dioxine upon disposal and incineration, when a film having a crosslinked structure is formed from an acrylic resin emulsion using a simple method such as dipping method.

The present inventors have further studied about an interior surface treating agent suited for an acrylic resin glove. As a result, the present inventors have also succeeded in obtaining an acrylic resin glove which is superior in fitting and detaching properties, that are not deteriorated during the use for a long period, and which exerts a small influence on the environment upon disposal, when micro-particles of predetermined organic fillers are contained in an acrylic resin emulsion and the content thereof is adjusted within a predetermined range.

That is, the present invention includes the following inventions:

(1) An acrylic resin glove comprising a film having a crosslinked structure, said film being formed of an acrylic resin emulsion;

(2) The acrylic resin glove according to the item (1), wherein the film is formed by a heat sensitizing method;

(3) The acrylic resin glove according to the item (1) or (2), wherein the acrylic resin emulsion contains a crosslinking agent;

(4) The acrylic resin glove according to the item (2), wherein the crosslinking agent contains zinc white and a resin crosslinking agent;

(5) The acrylic resin glove according to the item (4), wherein the content of zinc white is within a range from 0.5 to 5 parts by weight based on 100 parts by weight of the resin solid content of the acrylic resin emulsion and the content of the resin crosslinking agent is within a range from 0.5 to 5 parts by weight based on 100 parts by weight of the resin solid content of the acrylic resin emulsion;

(6) The acrylic resin glove according to the item (1) or (2), wherein the elongation at breakage determined by the tensile test defined in JIS S 2042 is not less than 300% (JIS is the abbreviation of Japanese Industrial Standards herein);

(7) The acrylic resin glove according to the item (1) or (2), wherein both of the tensile load retention and elongation at breakage retention determined by the detergent resistance test defined in JIS S 2042 is not less than 70%;

(8) An acrylic resin glove comprising an acrylic resin bag body, and a film of an internal surface treating agent for acrylic resin glove formed on the internal surface of the acrylic resin bag body, said internal surface treating agent containing an acrylic resin emulsion, and at least one organic filler selected from the group consisting of (meth)acrylic resin micro-particles, polyolefinic resin micro-particles and cellulose beads, each having an average particle diameter within a range from 3 to 10 μm, the content of said organic filler being within a range from 2 to 8% by weight based on the total weight;

(9) The acrylic resin glove according to the item (8), wherein a film of an internal surface treating agent further containing a crosslinking agent in the acrylic resin emulsion is formed on the internal surface of the acrylic resin glove body;

(10) An internal surface treating agent for acrylic resin glove, comprising an acrylic resin emulsion, and at least one organic filler selected from the group consisting of (meth)acrylic resin micro-particles, polyolefinic resin micro-particles and cellulose beads, each having an average particle diameter within a range from 3 to 10 μm, the content of said organic filler being within a range from 2 to 8% by weight based on the total weight; and

(11) The internal surface treating agent for acrylic resin glove according to the item (10), further containing a crosslinking agent.

According to the glove of the present invention described in the item (1), it is made possible to obtain a glove having physical properties, that are identical or superior to those of a glove made of a vinyl chloride resin, by incorporating a heat sensitizing agent and an anode cohesive agent into a predetermined acrylic resin emulsion, dipping a heated mold to gel the emulsion and subjecting to a drying treatment, that is, through a simple production process, similar to the case of producing a glove made of a vinyl chloride resin using a conventional dipping method.

Since the acrylic resin glove of the present invention can be produced by a more simple step, the film is preferably formed by a heat sensitizing method as described in the item (2).

The acrylic resin emulsion used for film formation in the present invention preferably contains a crosslinking agent as described in the item (3). The crosslinking agent is preferably zinc white or a resin crosslinking agent. In this case, the content of the resin crosslinking agent is within a range from 0.5 to 5 parts by weight based on 100 parts by weight of the resin solid content of the acrylic resin emulsion.

The acrylic resin glove of the present invention can improve the elongation as required characteristics of a glove by appropriately adjusting the type of acrylic resin emulsion, and the type and amount of crosslinking agent (particularly zinc white and resin crosslinking agent). In addition, it can also improve the resistance to detergent, and durability of the glove.

The acrylic resin glove of the present invention, wherein the type of the acrylic resin emulsion, and the type and amount of the crosslinking agent have been adjusted, is characterized in that (i) the elongation at breakage determined by the tensile test defined in JIS S 2042 is not less than 300% as described in the item (6) or (7) and/or (ii) the tensile load retention and elongation at breakage retention determined by the detergent resistance test defined in JIS S 2042 are not less than 70%.

According to the interior surface treating agent described in the item (9) of the present invention, a resin emulsion as a base of the interior surface treating agent is the same resin as an acrylic resin constituting the acrylic resin glove body. Therefore, the adhesion between a layer of the interior surface treating agent to be provided in a glove body by an interior surface treatment and the glove body is good and peel-off does not occur during the use for a long period.

Furthermore, since the interior surface treating agent contains micro-particles of the predetermined organic fillers and the content is adjusted within a predetermined range, it is made possible to impart good lubricity to the interior surface of the acrylic resin glove. The interior surface treating agent according to the present invention preferably contains a crosslinking agent in the acrylic resin emulsion as described in the item (10). In this case, the acrylic resin glove body and the interior surface treating agent layer provided in the interior surface of the acrylic resin glove can be simultaneously crosslinked, thereby improving the adhesion between the interior surface treating agent layer and the acrylic resin glove body.

The acrylic resin glove described in the item (8) according to the present invention is characterized in that a film of the interior surface treating agent is formed on the interior surface of the acrylic resin glove body. The acrylic resin glove has noticeably excellent fitting and detaching feel, thereby making it possible to make fitting and detaching feel excellent without impairing an intrinsic large modulus of the acrylic resin glove.

According to the interior surface treating agent of the present invention, the lubricity of the interior surface can be improved and the state can be maintained for a long period without deteriorating intrinsic physical properties of the acrylic resin glove. According to the acrylic resin glove treated with the interior surface treating agent of the present invention, fitting and detaching can be smoothly conducted for a long period.

DETAILED DESCRIPTION OF THE INVENTION

The present invention will now be described in detail.

In the glove of the present invention, a film is formed by using an acrylic resin emulsion.

Acrylic Resin Emulsion

Examples of the acrylic resin emulsion used in the present invention include those of various grades ranging from hard to soft, for example:

(1) an emulsion of a homopolymer of acrylic acid, acrylate, (meth)acrylic acid or (meth)acrylate;

(2) an emulsion of a copolymer which is obtained by using at least two of four monomers disclosed in the item (1) in combination;

(3) an emulsion of a copolymer of any of the polymers disclosed in the items (1) and (2), and vinyl acetate, styrene or acrylonitrile;

(4) an emulsion of a polymer which is obtained by copolymerization of the polymer disclosed in the items (1) to (3) with a monomer having a crosslinking group such as hydroxyl, carboxyl or N-methylol ether group, etc. When using an acrylic resin emulsion having a self-crosslinking ability as described in the items (3) and (4), a glove having a high modulus can be obtained without incorporating a crosslinking agent described below.

The substituent constituting an ester moiety in the acrylate and (meth)acrylate includes, for example, an alkyl group having 1 to 4 carbon atoms, such as methyl, ethyl, n-propyl, i-propyl, n-butyl, or t-butyl.

Specific examples of the acrylic resin emulsion include those which are manufactured by Nippon Zeon Co., Ltd. (Japan) under the trade name of "LX851" (Tg=15° C.) "LX852" (Tg=−6° C., soft type), "LX854" (Tg=−10° C.), "LX857" (Tg=43° C., hard type) (the glass transition temperature Tg and the grade of soft or hard were shown at the back of the trade name).

In the present invention, the acrylic resin emulsion preferably contains a crosslinking agent so as to improve the crosslinking ability of the acrylic resin and to enhance the strength of the glove.

When the emulsion of the items (3) and (4), i.e. an emulsion having the self-crosslinking ability is used as the acrylic resin emulsion, a film can be formed in the absence of a crosslinking agent, but the strength of the glove can be more enhanced by incorporating a crosslinking agent.

Crosslinking Agent

The acrylic resin emulsion include conventionally known various crosslinking agents used for processing the polymer, for example:

(a) zinc white, or (b) a resin crosslinking agent such as melamine resin, epoxy resin, oxazoline resin, or block isocyanate.

The content of the crosslinking agent is optionally selected so as to exhibit adequate crosslinking ability. In general, the total amount of the zinc white (a) and the resin crosslinking agent (b) is preferably within a range from 1 to 10 parts by weight, and particularly preferably from 1 to 5 parts by weight.

Each of the zinc white (a) and the resin crosslinking agent (b) can be contained in the acrylic resin emulsion, respectively, but they are used in combination more preferably. When using them in combination, different additional effects can be exhibited, for example, zinc white can improve the film-formation ability by a heat sensitizing method, while the resin crosslinking agent (b) can improve the detergent resistance of the acrylic resin glove.

With respect to the content of the crosslinking agent based on 100 parts by weight of the resin solid content of the acrylic resin emulsion, about 0.5 to 5 parts by weight of zinc white and 0.5 to 5 parts by weight of a resin crosslinking agent are used in combination, more preferably. When the content of the zinc white exceeds the above range, the elongation of the glove is likely to be lowered. On the other hand, when the content of the resin crosslinking agent exceeds the above range, the detergent resistance of the glove is likely to be deteriorated.

Other Additives

The acrylic resin emulsion used in the production of the acrylic resin glove of the present invention may contain conventionally known various additives such as antioxidants, fillers and dispersants, in addition to crosslinking agents.

As the antioxidant, non-staining phenols are preferably used, but amines may also be used. The amount of the antioxidant is preferably within a range from about 0.5 to 3 parts by weight based on 100 parts by weight of the resin solid content of the acrylic resin emulsion. The filler includes, for example, kaolin clay, hard clay, calcium carbonate, etc. The amount of the filler is preferably not more than 10 parts by weight based on 100 parts by weight of the above resin solid content. The dispersant may also be incorporated to improve the dispersion of the respective additives into the acrylic resin emulsion. The dispersant includes, for example, various anionic surfactants. The amount of the dispersant is preferably within a range from about 0.3 to 1.0 parts by weight based on the weight of the component to be dispersed.

Physical Properties of Glove

The acrylic resin glove of the present invention has preferably a tension stress $M_{300}$ (i.e. modulus) of not less than 7.0 MPa, especially within from 7.0 to 8.0 MPa at 300% elongation defined in JIS K 6251 (tensile test of vulcanized rubber) so as to improve various properties such as modulus, flexibility and elongation of the glove. When the above tension stress $M_{300}$ is lower than 7.0 Mpa, there is a fear that it becomes impossible to obtain and detaching properties that are identical or superior to those of a glove made of a vinyl chloride resin.

The acrylic resin glove of the present invention can improve the elongation as required characteristics of the glove and the resistance to detergent by appropriately selecting the acrylic resin emulsion and crosslinking agent from those described above and appropriately adjusting the amount of the zinc white and resin crosslinking agent within the above range.

The acrylic resin glove of the present invention preferably has an elongation at breakage $E_B$ of not less than 300% determined by "the tensile test" defined in JIS S 2042 in order to obtain excellent flexibility on fitting and a fitting feel for hand.

To afford the elongation at breakage $E_B$ of not less than 300%, the content of zinc white based on acrylic resin emulsion used for film formation of the glove is not limited, but may be not more 5 parts by weight based on 100 parts by weight of the resin solid content of the resin emulsion.

The elongation at breakage $E_B$ of the acrylic resin glove is preferably not less than 350%, and more preferably not less than 400%.

The acrylic resin glove of the present invention preferably has the tensile load retention SR and elongation at breakage retention $S_E$ of not less than 70% determined by "the detergent resistance test" defined in JIS S 2042 in order to enhance the resistance to detergent and to improve the durability of the glove.

To afford the tensile load retention SR and elongation at breakage retention $S_E$ of not less than 70%, the content of the resin crosslinking agent based on acrylic resin emulsion used for film formation of a glove is not limited, but may be adjusted within a range from 0.5 to 5 parts by weight based on 100 parts by weight of the resin solid content of the resin emulsion.

The tensile load retention $S_R$ and elongation at breakage retention $S_E$ of the acrylic resin glove may be preferably not less than 75%, and more preferably not less than 80%.

Furthermore, as defined in JIS S 2042, the tensile load retention $S_R$ (%) can be calculated from the tensile load retention $X_A$ (N/cm) before dipping and the tensile load retention $X_B$ (N/cm) after dipping according to the formula (1):

$$S_R(\%)=(X_B/X_A)\times 100 \tag{1}$$

On the other hand, the retention of elongation at breakage $S_E$ can be calculated form the elongation at breakage $X_C$ (%) before dipping and the elongation at breakage $X_D$ (%) after dipping according to the formula (2):

$$S_E(\%)=(X_D/X_C)\times 100 \tag{2}$$

Method for Production of Glove

The glove of the present invention is produced by incorporating a heat sensitizing agent and a cohesive agent into a predetermined acrylic resin emulsion, optionally incorporating a crosslinking agent as described above, dipping a heated mold to gel the resin emulsion, and subjecting to a drying treatment.

The temperature of the mold of glove is preferably adjusted depending on the type of the acrylic resin emulsion, and is usually adjusted so that the temperature of surface of the mold is within a range from about 70 to 100° C. Furthermore, conventionally known molds such as molds made of china, ceramic, etc. can be used as the mold for the glove.

The heat sensitizing agent includes, for example, inorganic or organic ammonium salt such as ammonium nitrate, ammonium acetate, zinc-ammonium complex salt, etc.; and water-soluble polymer having a clouding point of not less than ordinary temperature and not more than 100° C., such as polyvinyl methyl ether, polyalkylene glycol, polyether polyformal, functional polysiloxane, etc.

The anode cohesive agent includes, for example, divalent or multivalent metal salt, such as calcium nitrate, calcium chloride, etc.; and organic alkylamine salt such as tetramethylammonium hydrate.

The amount of the heat sensitizing agent and the anode cohesive agent may be adjusted according a conventional procedure, and is normally adjusted within a range from 0.5 to 5 parts by weight, particularly from 0.5 to 2.0 parts by weight, based on 100 parts by weight of the resin solid content of the resin emulsion.

Method for production of glove should not be limited to this heat sensitizing method. For example, a normal salt coagulation method or direct coagulation method using a high viscosity incorporating agent can be also employed.

The interior surface treating agent for the acrylic resin glove of the present invention and the acrylic resin glove obtained by using the same will be now described.

[Interior Surface Treating Agent]

Acrylic Resin Emulsion

The acrylic resin emulsion which can be used in the interior surface treating agent according to the present invention includes, for example, those (1) to (4) described above.

The same crosslinking agent as that described above is preferably added in the acrylic resin emulsion as a base emulsion of the interior surface treating agent for the acrylic resin glove of the present invention so as to improve the adhesion between a layer which is formed by the interior surface treating agent and the acrylic resin glove and to enhance the strength of the acrylic resin glove.

When using an emulsion having a self-crosslinking ability described in the items (3) and (4) as the acrylic resin emulsion, a film can be formed in the absence of a crosslinking agent, and the strength of the acrylic resin glove can be further improved by incorporating the crosslinking agent.

The crosslinking agent includes conventionally known various crosslinking agents used for processing a polymer, such as melamine resin and epoxy resin.

The amount of the crosslinking agent is not specifically limited, but is preferably within a range from 1 to 10 parts by weight, and particularly from 1 to 5 parts by weight, based on 100 parts by weight of the resin solid content of the acrylic resin emulsion.

If necessary, conventionally known various components such as antioxidants, fillers and dispersants can be added to the acrylic resin emulsion, in addition to the above crosslinking agents and organic fillers described bellow.

As the antioxidant, non-staining phenols are preferably used, but amines may also be used. The amount of the antioxidant is preferably within a range from about 0.5 to 3 parts by weight based on 100 parts by weight of the resin solid content of the acrylic resin emulsion. The filler includes, for example, kaolin clay, hard clay, calcium carbonate, etc. The amount of the filler is preferably not more than 10 parts by weight based on 100 parts by weight of the above resin solid content. The dispersant is added to improve the dispersion of the respective additives described above into the acrylic resin emulsion. The dispersing agent includes, for example, anionic surfactants. The amount of the dispersant is preferably within a range from about 0.3 to 1.0 parts by weight based on the weight of the component to be dispersed.

Organic Filler

In the interior surface treating agent according to the present invention, micro-particles of (meth)acrylic resins such as methyl methacrylate(PMMA), micro-particles of polyolefinic resins such as polyethylene and polypropylene, or organic fillers of cellulose beads are added to the acrylic resin emulsion.

An average particle diameter of the organic filler is adjusted within a range from 3 to 10 $\mu$m. When the average particle diameter is lower than the above range, it becomes impossible to impart sufficient lubricity to the interior surface of the acrylic resin glove. Therefore, there is a fear that it becomes impossible to impart good fitting and detaching feels to the acrylic resin glove. On the other hand, when the average particle diameter exceeds the above range, rough feel occurs on the interior surface of the acrylic resin glove. Therefore, there is a fear that fitting and detaching feels of the glove are impaired. The average particle diameter of the organic filler is particularly preferably within a range from 3 to 6 $\mu$m in the above range.

The amount of the organic filler is adjusted within a range from 2 to 8 parts by weight based on the total interior surface treating agent. When the average particle diameter is lower than the above range, it becomes impossible to impart sufficient lubricity to the interior surface of the acrylic resin glove. Therefore, there is a fear that it becomes impossible to impart good fitting and detaching feels to the acrylic resin glove. On the other hand, when the average particle diameter exceeds the above range, a layer of the interior treating agent is hardly formed or rough feel occurs on the interior surface of the acrylic resin glove. Therefore, there is a fear that fitting and detaching feels of the glove are impaired. The amount of the organic filler is particularly within a range from 2 to 6 parts by weight in the above range.

Acrylic Resin Glove

The acrylic resin glove can be produced by using the interior treating agent through the following steps (a) to (d) of:

(a) adding a heat sensitizing agent and an anode cohesive agent and optionally adding a crosslinking agent to a predetermined acrylic resin emulsion;

(b) dipping a heated mold for glove in the resin emulsion, thereby to gel the resin emulsion to form a film;

(c) dipping the mold for glove, provided with a film, in a pre-heated interior surface treating agent according to the present invention, thereby to form a layer of the interior surface treating agent on the surface of the film; and (d) heating the film and the interior surface treating agent layer, thereby to simultaneously crosslink the both, and removing a laminate of the film and a layer of the interior surface treating agent from the mold of for a glove with turning.

The heat sensitizing agent used in the step (a) includes, for example, inorganic or organic ammonium salt such as ammonium nitrate, ammonium acetate, zinc-ammonium complex salt, etc.; or water-soluble polymer having a clouding point of not less than ordinary temperature and not more than 100° C., such as polyvinyl methyl ether, polyalkyleneglycol, polyether polyformal, functional polysiloxane, etc.

The anode cohesive agent includes, for example, divalent or multivalent metal salt such as calcium nitrate, calcium chloride, etc.; or organic alkylamine such as tetramethylammonium hydrate.

The amount of the heat sensitizing agent and anode cohesive agent may be adjusted according a conventional procedure, and is normally adjusted within a range from 0.5 to 5 parts by weight, particularly from 0.5 to 2.0 parts by weight, based on 100 parts by weight of the resin solid content of the resin emulsion.

The type and the amount of the crosslinking agent are the same as those in case of the crosslinking agent added to the interior surface treating agent.

In the step (b), the temperature of the mold for glove is preferably adjusted depending on the type of the acrylic resin emulsion, and is usually adjusted so that the temperature of the surface of the mold is within a range from about 70 to 100° C. Furthermore, conventionally known molds such as molds made of china, ceramic, etc. can be used as the mold for glove.

The crosslinking treatment in the step (d) is not specifically limited, but may be carried out at a temperature within a range from 100 to 130° C. for 20 to 60 minutes.

As described before, the acrylic resin glove of the present invention has preferably a tension stress $M_{300}$ (i.e. modulus) of not less than 7.0 MPa, especially within from 7.0 to 8.0 MPa on 300% tension defined in JIS K 6251 (tensile test of vulcanized rubber) to improve various properties such as modulus, flexibility and elongation of the glove on forming a film of the interior surface treating agent for the acrylic resin glove of the present invention on the surface of the acrylic resin glove body. A tension stress of the glove $M_{300}$ can be preferably adjusted by the type of the acrylic resin emulsion used, especially difference between soft and hard, mixing ratio, etc. Furthermore, when the tension stress $M_{300}$ is lower than 7.0 Mpa, there is a fear that it becomes impossible to obtain fitting and detaching properties, that are equivalent or superior to those of a glove made of a vinyl chloride resin.

EXAMPLES

The following Examples and Comparative Examples further illustrate the present invention.

Production of Glove and Evaluation of Elongation, Fitting and Detaching Properties

Example 1

An acrylic resin emulsion manufactured by Nippon Zeon Co., Ltd. (Japan) under the trade name "LX852" and that manufactured by the same company under the trade name of "LX857" manufactured were mixed so that a weight ratio of a dry polymer (resin solid content) is 20:80. Then, 5 parts by weight of zinc white (crosslinking agent), 0.5 parts by weight of polyvinyl methyl ether (heat sensitizing agent) and 1.5 parts by weight of calcium nitrate (anode cohesive agent) were added based on 100 parts by weight of sum of dry polymers.

A mold for glove pre-heated to about 100° C. was dipped in the resin emulsion for 5 seconds, and then the mold for glove was pulled up and dried at room temperature. The resin emulsion film was allowed to stand in an oven at 120° C. for 30 minutes and dried completely to obtain an acrylic resin glove.

Example 2

In the same manner as in Example 1, except that the weight ratio of the acrylic resin emulsions "LX852" and "LX857" to the dry polymer (resin solid content) was adjusted to 50:50 and the amount of zinc white was adjusted to 1 part by weight, an acrylic resin glove was made.

Example 3

In the same manner as in Example 1, except that 5 parts by weight of a melamine resin [manufactured by DAINIPPON INK AND CHEMICALS, INC. (Japan) under the trade name of "BEKKAMIN PM-N"] was incorporated in place of zinc white, an acrylic resin glove was made.

Example 4

In the same manner as in Example 2, except that zinc white was not added, an acrylic resin glove was made.
(Tensile Test)

The acrylic resin glove obtained from Examples 1 to 4 was punched to prepare a dumbbell specimen No.4 defined in JIS K 6251 (tensile test of vulcanized rubber).

The tension stress at an elongation of 300% $M_{300}$ (MPa), tension strength $T_B$ (MPa) and elongation at breakage $E_B$ (%) were measured according to the test procedure described in JIS K 6251.

Furthermore, in the same manner as in Example 1, the respective measurements was conducted using a glove made of a natural rubber [manufactured by Dunlop Home Products Co., Ltd. (Japan) under the trade name of "SAWAYAKA TENENNGOME USUDE"] (Comparative Example 1) and a glove made of a vinyl chloride resin [manufactured by the same under the trade name of "SAWAYAKA VINYL USUDE"] (Comparative Example 2), respectively.
(Fitting and Detaching Properties of Glove)

The glove of the above Examples and Comparative Examples were actually fit by five subjects to evaluate a fitting feel of the glove (ease of working on fitting the rubber glove; degree of load on hands, and degree of tightening hands, so-called fitting feel) and a detaching feel (handling on fitting or detaching of a rubber glove).

The fitting and detaching properties were evaluated according to the following criteria, which was expressed by the average evaluation of the respective subject.

Fitting Property

⊚: very soft fitting feel, good flexibility capable of naturally bending fingers, and feel as if fitting no glove ○: soft fitting feel and good flexibility capable of naturally bending fingers Δ: slightly hard glove, but no problem in practical use;

X: poor fitting feel, and feel fatigued on hand during fitting for a long period.

Detaching Property

⊚: very easy to fit (wear) and detach;

○: easy to wear and detach;

ΔΔ: hard to wear and detach;

X: vary hard to wear and detach.

The results are shown in Table 1.

TABLE 1

| | Mixing ratio*[1] | Heat sensitizing agent | Anode cohesive agent | Crosslinking agent | |
|---|---|---|---|---|---|
| | | | | Zinc white | Melamine resin |
| Example 1 | 20:80 | 0.5*[2] | 1.5*[3] | 5 | 0 |
| Example 2 | 50:50 | 0.5*[2] | 1.5*[3] | 1 | 0 |
| Example 3 | 20:80 | 0.5*[2] | 1.5*[3] | 0 | 5 |
| Example 4 | 50:50 | 0.5*[2] | 1.5*[3] | 0 | 0 |
| Comparative Example 1 | (Glove made of natural rubber) | | | | |
| Comparative Example 2 | (Glove made of vinyl chloride) | | | | |

| | Tensile test | | | Evaluation of Physical properties | |
|---|---|---|---|---|---|
| | $M_{300}$ (MPa) | $T_a$ (MPa) | $E_B$ (%) | Fitting property | Detaching property |
| Example 1 | 7.0 | 8.0 | 390 | ⊚ | ⊚ |
| Example 2 | 8.0 | 9.6 | 355 | ⊚ | ⊚ |
| Example 3 | 7.2 | 8.8 | 500 | ⊚ | ⊚ |
| Example 4 | 7.0 | 7.9 | 400 | ⊚ | ⊚ |
| Comparative Example 1 | 1.8 | 28.5 | 840 | × | × |
| Comparative Example 2 | 7.9 | 11.8 | 470 | ⊚ | ⊚ |

*[1]: Weight ratio (LX857:LX852) of resin solid content
*[2]: Polyvinyl methyl ether
*[3]: Calcium nitrate
*[2,3]: Amount (parts by weight) based on 100 parts by weight of sum of resin solid contents As is apparent from Table 1, according to Examples 1 to 4, there could be obtained a glove having excellent fitting and detaching properties that are equivalent or superior to those of a glove made of a vinyl chloride resin of Comparative Example 2.

On the other hand, a glove made of a natural rubber resin of Comparative Example 1 had too low modulus to provide sufficient fitting and detaching properties.

Production of Glove and Evaluation of Elongation, Fitting and Detaching Properties

Example 5

An acrylic resin emulsion manufactured by Nippon Zeon Co., Ltd. (Japan) under the trade name of "LX852" and that manufactured by the same company under the trade name of "LX854" are mixed so that a weight ratio of a dry polymer (resin solid content) is 80:20. Three (3) parts by weight of zinc white (crosslinking agent), 1 part by weight of a melamine resin (resin crosslinking agent), 0.5 parts by weight of polyvinyl methyl ether (heat sensitizing agent) and 1.5 parts by weight of calcium nitrate (anode cohesive agent) were then added based on 100 parts by weight of the total.

Furthermore, a melamine resin manufactured by DAINIPPON INK AND CHEMICALS, INC. (Japan) under the trade name "BEKKAMIN PM-N" was used as the melamine resin.

A mold for glove pre-heated to about 100° C. was dipped in the resin emulsion for 5 seconds, and then the mold for glove was pulled up and dried at room temperature. The resin emulsion film was allowed to stand in an oven at 100° C. for 30 minutes and dried completely to obtain a glove.

Example 6

In the same manner as in Example 5, except that the amount of the melamine resin was adjusted to 5 parts by weight, an acrylic resin glove was obtained.

Example 7

In the same manner as in Example 5, except that 5 parts by weight of an epoxy resin [manufactured by DAINIPPON INK AND CHEMICALS, INC. (Japan) under the trade name "CR-5L"] was used as the resin crosslinking agent in place of the melamine resin, an acrylic resin glove was obtained.

Example 8

In the same manner as in Example 5, except that 5 parts by weight of an oxazoline resin [manufactured by NIPPON SHOKUBAI CO., LTD. (Japan) under the trade name "EPOCROSS WS-500"] was used as the resin crosslinking agent in place of a melamine resin, an acrylic resin glove was obtained.

Example 9

In the same manner as in Example 5, except that 5 parts by weight of a block isocyanate [manufactured by Sumitomo Bayer Urethane Co., Ltd. (Japan) under the trade name "BAYHYJULE BL116"] was used as a resin crosslinking agent in place of a melamine resin, an acrylic resin glove was obtained.

Example 10

In the same manner as in Example 5, except that a melamine resin (resin crosslinking agent) was not incorporated, an acrylic resin glove was obtained.

Example 11

In the same manner as in Example 5, except that the amount of a melamine resin was adjusted to 8 parts by weight, an acrylic resin glove was obtained.

Example 12

In the same manner as in Example 5, except that 8 parts by weight of the above oxazoline resin "EPOCROSS WS-500" was used as the resin crosslinking agent in place of the melamine resin, an acrylic resin glove was obtained.

(Tensile Test)

The acrylic resin glove obtained in Examples 5 to 12 was punched to prepare a dumbbell specimen No.4 defined in JIS K 6251 (tensile test of vulcanized rubber).

The elongation at breakage $E_B(\%)$ was determined according to the test method described in the above JIS K 6251.

(Evaluation Test for Detergent Resistance)

The acrylic resin gloves obtained in the above Examples and Comparative Examples were evaluated with respect to the detergent resistance according to the definition in "detergent resistance test" described in JIS S 2042 "Household rubber gloves" (or "Detergent Resistance test for Household vinyl gloves" in JIS S 2045).

The test was carried out by adjusting the temperature of a 2% sodium n-lauryl benzene sulfonate solution to 55±1° C. and dipping a whole glove in the solution for 22±0.25 hours. The tensile load at breakage retention $S_R$ and elongation at breakage retention $S_E$ were determined.

(Evaluation of Heat Sensitizing Ability)

With respect to Examples 5 to 12, the film forming property in case of forming a film from an acrylic resin emulsion by a sensitizing method was evaluated and this was regarded as heat sensitizing ability.

The evaluation was conducted by three levels: ○ [good film forming property (heat sensitizing ability) and possible to form a film having uniform thickness; Δ: insufficient film forming property (heat sensitizing ability) and possible to form a film having non-uniform thickness]; and X: poor film forming property (heat sensitizing ability) and impossible to form a film.

The results are shown in Table 2.

TABLE 2

| | Crosslinking agent | | | | Detergent resistance | | |
| | Resin crosslinking agent | | Zinc white | Elongation | | | Heat sensitizing |
| | Type | Content | Content | $E_B$ (%) | $S_R$ (%) | $S_E$ (%) | agent |
|---|---|---|---|---|---|---|---|
| Example 5 | Melamine resin | 1 | 3 | 520 | 73 | 80 | ○ |
| Example 6 | Melamine resin | 5 | 3 | 340 | 87 | 90 | ○ |
| Example 7 | Epoxy resin | 5 | 3 | 320 | 85 | 100 | ○ |

TABLE 2-continued

| | Crosslinking agent | | Zinc white Content | Elongation $E_B$ (%) | Detergent resistance | | Heat sensitizing agent |
|---|---|---|---|---|---|---|---|
| | Resin crosslinking agent | | | | | | |
| | Type | Content | | | $S_R$ (%) | $S_E$ (%) | |
| Example 8 | Oxazoline resin | 5 | 3 | 370 | 77 | 83 | ○ |
| Example 9 | Block isocyanate | 5 | 3 | 320 | 83 | 90 | ○ |
| Example 10 | — | — | 3 | 600 | 50 | 50 | ○ |
| Example 11 | Melamine resin | 8 | 3 | 275 | 88 | 92 | ○ |
| Example 12 | Oxazolinine resin | 8 | 3 | 200 | 82 | 85 | ○ |

*Contents (parts by weight) of resin crosslinking agent and zinc white are those based on 100 parts by weight of resin solid content of acrylic resin emulsion
**$E_B$ is elongation at the breakage, $S_R$ is retention of tensile load at breakage, and $S_E$ is retention of elongation at breakage.

As is apparent from Table 2, according to Examples 5 to 9 wherein the content of the zinc white and the resin crosslinking agent in the acrylic resin emulsion was adjusted within a range from 0.5 to 10 parts by weight based on 100 part by weight of the resin solid content of the above acrylic resin emulsion, there could be obtained an acrylic resin glove which is superior in not only fitting and detaching properties but also elongation and detergent resistance by a simple method such as heat sensitizing method.

On the other hand, an acrylic resin glove obtained in Example 10 had actually adequate physical properties such as fitting and detaching properties, elongation, etc., but the detergent resistance was inferior to gloves obtained in Examples 5 to 9 because no resin crosslinking agent was incorporated in the acrylic resin emulsion.

Furthermore, acrylic resin gloves obtained in Examples 11 and 12 had actually sufficient physical properties such as detergent resistance, etc., but the elongation was low and fitting and detaching properties were poor because of a large amount of the resin crosslinking agent (and content of the whole crosslinking agent) in the acrylic resin emulsion.

According to the acrylic resin glove of the present invention, there can be obtained an acrylic resin glove having physical properties that are equivalent or superior to those of a vinyl chloride glove, particularly fitting and detaching properties. Sufficient elongation and excellent detergent resistance can be also imparted by appropriately adjusting the content of the zinc white and the resin crosslinking agent in the acrylic resin emulsion used for production of the acrylic resin glove.

Such an acrylic resin glove can be produced by a simple producing method and does not generate dioxine on disposal and incineration to cause contamination of the environment, because no vinyl chloride is contained.

Example 13
(Preparation of Interior Surface Treating Agent)

A mixture of an acrylic resin emulsion "LX852" (trade name manufactured by Nippon Zeon Co., Ltd. (Japan), Tg=−6° C., soft type) and "LX857" (trade name manufactured by the same company, Tg=43° C., hard type) at a ratio of 80:20 was used as the interior surface treating agent.

Three (3) parts by weight of zinc white (crosslinking agent) was added based on 100 parts by weight of the dry polymer (resin solid content) of the base emulsion, and then the mixture was diluted with distilled water so that a concentration of the dry polymer is 0.4% by weight.

Then, particles of methyl polymethacrylate (PMMA) as the organic filler [manufactured by Nippon Pure Chemicals Co., Ltd. (Japan) under the trade name of "JYULIMAR MB-S", average particle diameter of 4 μm] was incorporated into the diluted blend emulsion in a ratio of 2% by weight to obtain an interior surface treating agent for the acrylic resin emulsion.
(Production of Glove Body)

A mixture of "LX852" and "LX857" in a weight ratio of a dry polymer (resin solid content) of 80:20 was used as the acrylic resin emulsion.

Five (5) parts by weight of zinc white (crosslinking agent), 0.5 parts by weight of polyvinyl methyl ether (heat sensitizing agent), and 1.5 parts by weight of calcium nitrate (anode cohesive agent) were added based on 100 parts by weight of the total dry polymer in the acrylic resin emulsion to impart the heat sensitizing ability to the acrylic resin emulsion.

Then, a mold for glove heated to about 100° C. was dipped in the acrylic resin emulsion for about 5 seconds and the glove was pulled up.
(Preparation of Interior Surface-treated Acrylic Resin Glove)

A film of the acrylic resin emulsion, which has been formed on the surface of the mold for glove in "Production of glove body" was dipped in the interior surface treating agent obtained in "Preparation of interior surface treating agent" as a whole mold for glove for 20 seconds, the resin emulsion being in a gel phase. Thus, a layer of the interior surface treating agent was formed on the surface of the film.

In case of forming a layer of the interior surface treating agent, the interior surface treating agent was used at room temperature and the film of the acrylic resin emulsion was dipped in the interior surface treating agent for about 20 seconds. The mold for glove was pulled up from the interior surface treating agent and then heated at 100 to 130° C. for 20 to 60 minutes thereby to crosslink between the film formed on the surface of the mold (glove body) and the layer on the interior surface treating agent.

Then, the layer formed of resin emulsion and the interior surface treating agent was removed from a mold with turning to obtain an acrylic resin glove whose interior surface is lubricated.

Examples 14 and 16

In the same manner as in Example 13, except that the amount of the organic filler in the interior surface treating agent was adjusted to the value indicated in Table 3, an acrylic resin glove whose interior surface is lubricated was obtained.

Example 17

In the same manner as in Example 13, except that as the organic filler in the interior surface treating agent, one having a particle diameter indicated in Table 3 was used and the amount of the organic filler was adjusted to the value indicated in Table 3, an acrylic resin glove whose interior surface is lubricated was obtained.

Comparative Examples 3 and 4

In the same manner as in Example 13, except that the amount of the organic filler in the interior surface treating agent was adjusted to the value indicated in Table 4, an acrylic resin glove whose interior surface is lubricated was obtained.

Comparative Examples 5 and 6

In the same manner as in Example 13, except that as the organic filler in the interior surface treating agent, one having a particle diameter indicated in Table 4 was used and the amount of the organic filler was adjusted to the value indicated in Table 4, an acrylic resin glove whose interior surface is lubricated was obtained.

Comparative Example 7

One (1) part by weight of sulfur (curing agent), 1 part by weight of zinc white (crosslinking agent) and 1 part by weight of zinc dibutyl carbamate (vulcanization accelerator, BZ) were added based on 100 parts by weight of the rubber solid content in a natural rubber (NR) latex as a base latex, and then the mixture was diluted so that a concentration of the rubber solid content is 0.4% by weight to obtain NR latex as a base.

In the same manner as in Example 13, except that the above NR latex was used in place of the acrylic resin emulsion as the interior treating agent, an acrylic resin glove whose interior surface is lubricated was obtained.

Comparative Example 8

One (1) part by weight of sulfur (curing agent), 1 part by weight of zinc white (crosslinking agent) and 1 part by weight of zinc dibutyl carbamate (vulcanization accelerator, BZ) were added based on 100 parts by weight of the rubber solid content in an acrylonitrile-butadiene rubber (NBR) latex as a base latex, and then the mixture was diluted to give a concentration of the rubber solid content of 0.4% by weight to obtain NBR latex as a base.

In the same manner as in Example 13, except that the above NBR latex was used in place of the acrylic resin emulsion as the interior treating agent, an acrylic resin glove whose interior surface is lubricated was obtained.

Evaluation of Physical Properties
(Measurement of Friction Coefficient)

The static friction coefficient of the interior surface (surface having a higher lubricity, wherein a layer of the interior surface treating agent had been formed) in the gloves obtained in the above Examples and Comparative Examples was measured for before washing (before use) and after washing, using Heidon type 10 [manufactured by Shinto Kagaku Co., Ltd. (Japan) under the trade name of HEIDON-10DR] as a measuring machine. Furthermore, the measurement was conducted under the conditions of a load of 50 g, using normal paper as an object on measuring the friction coefficient.

In addition, an acrylic resin glove obtained in Reference Example, which is not treated with the interior surface treating agent, was used as a control. With respect to such a control, the friction coefficient was measured in the same manner as described above.

(Fitting and Detaching Properties of Glove)

The gloves of the above Examples and Comparative Examples and control were actually fit by ten subjects to evaluate fitting feel of the glove (ease of working on fitting a rubber glove; degree of load on hands and degree of tightening hands, so-called fitting feel) and a detaching feel (handling on fitting or detaching of a rubber glove).

The fitting and detaching properties were evaluated according to the same criteria as described above, which was expressed by the average evaluation of the respective subjects.

The results are shown in Tables 3 and 4.

TABLE 3

| | Interior surface treating agent Type of Base emulsion/base latex | Organic filler | |
|---|---|---|---|
| | | Particle diameter ($\mu$m) | Amount (% by weight) |
| Example 13 | Acrylic*1 | 4 | 2 |
| Example 14 | Acrylic*1 | 4 | 5 |
| Example 15 | Acrylic*1 | 10 | 2 |
| Example 16 | Acrylic*1 | 4 | 8 |
| Control | Containing no interior surface treating agent | — | — |

| | Evaluation of physical properties of glove | | |
|---|---|---|---|
| | Friction coefficient | Fitting and detaching feels | |
| | | Before washing | After washing |
| Example 13 | 0.50 | ◎ | ◎ |
| Example 14 | 0.42 | ◎ | ◎ |
| Example 15 | 0.55 | ◎ | ◎ |
| Example 16 | 0.40 | ◎ | ◎ |
| Control | 1.2 | ○ | ○ |

*1 Acrylic resin emulsion having resin solid content of 0.4% by weight

TABLE 4

| | Interior surface treating agent Type of Base emulsion/base latex | Organic filler | |
|---|---|---|---|
| | | Particle diameter ($\mu$m) | Amount (% by weight) |
| Comparative Example 3 | Acrylic*1 | 4 | 1 |
| Comparative Example 4 | Acrylic*1 | 4 | 10 |
| Comparative Example 5 | Acrylic*1 | 2 | 2 |
| Comparative Example 6 | Acrylic*1 | 20 | 2 |
| Comparative Example 7 | NR*2 | 5 | 3 |
| Comparative Example 8 | NBR*3 | 4 | 2 |
| Control | Containing no interior surface treating agent | — | — |

TABLE 4-continued

| | Evaluation of physical properties of glove | | |
|---|---|---|---|
| | Friction coefficient | Fitting and detaching feels | |
| | | Before washing | After washing |
| Comparative Example 3 | 0.93 | × | × |
| Comparative Example 4 | 0.52 | × | × |
| Comparative Example 5 | 1.00 | × | × |
| Comparative Example 6 | 0.70 | × | × |
| Comparative Example 7 | 1.0 | × | × |
| Comparative Example 8 | 1.0 | × | × |
| Control | 1.2 | ○ | ○ |

*[1]Acrylic resin emulsion having resin solid content of 0.4% by weight
*[2]NR latex incorporated with vulcanizing agent, having a resin solid content of 0.4% by weight
*[3]NBR latex incorporated with vulcanizing agent, having a resin solid content of 0.4% by weight As is apparent from Tables 3 and 4, gloves of Examples 13 to 16, wherein the layer of the interior surface treating agent according to the present invention had been provided on the interior surface of the acrylic resin glove, had a low static friction coefficient of the interior surface and excellent lubricity. In addition, they had excellent fitting and detaching feels and the lubricity could be sufficiently improved as compared with an acrylic resin glove whose interior surface was not treated. Furthermore, it was found that fitting and detaching feels before and after washing were excellent and, therefore, the effect obtained by forming a layer of the interior surface treating agent could be maintained for a long period.

On the other hand, regarding Comparative Example 3 wherein the amount of the organic filler in the interior surface treating agent is small and Comparative Example 5 wherein the particle diameter of the organic filler is small, the lubricity could not be sufficiently improved and excellent fitting and detaching feels could not be obtained.

In addition, regarding Comparative Example 4 wherein the amount of the organic filler in the interior surface treating agent was too large and Comparative Example 6 wherein the particle diameter was too large, the friction coefficient was small, but a rough feel occurred and fitting and detaching feels were insufficient.

On the other hand, regarding Comparative Examples 7 and 8 wherein the interior surface treating agent containing, as a base, a latex such as NR or NBR containing a vulcanizing agent was used, the fitting and detaching feel became inferior before washing because of insufficient adhesion between the interior surface treating agent layer and the acrylic resin glove body. Whereby, it became apparent that those of the same resin emulsion as the resin constituting the glove body are preferably used in the interior surface treating layer of the acrylic resin glove.

The disclosure of Japanese Patent Application Serial Nos. 11-107066, 11-193476, 11-307610, filed on Apr. 14, 1999, Jul. 7, 1999 and Oct. 28, 1999, respectively, is incorporated herein by reference.

What is claimed is:

1. An acrylic resin glove comprising a film having a crosslinked structure, said film being formed of an acrylic resin emulsion selected from the group consisting of (1) an emulsion of a homopolymer of any one of acrylic acid, acrylate, methacrylic acid or, methacrylate, (2) emulsion of a copolymer which is obtained by using at least two of four monomers in the item (1) in combination, (3) an emulsion of a copolymer of any of the polymers in the items (1) and (2), and vinyl acetate, styrene or acrylonitrile., (4) an emulsion of a polymer which is obtained by copolymerization of the polymer in the items (1) to (3) with a monomer having a crosslinking group of hydroxyl, carboxyl or N-methylol ether group, and a crosslinking agent containing zinc white and resin crosslinking agent.

2. The acrylic resin glove according to claim 1, wherein the film is formed by a heat sensitizing method.

3. The acrylic resin glove according to claim 1, wherein the acrylic resin emulsion contains a crosslinking agent.

4. The acrylic resin glove according to claim 1, wherein the content of zinc white is within a range from 0.5 to 5 parts by weight based on 100 parts by weight of the resin solid content of the acrylic resin emulsion and the content of the resin crosslinking agent is within a range from 0.5 to 5 parts by weight based on 100 parts by weight of the resin solid content of the acrylic resin emulsion.

5. The acrylic resin glove according to claim 1, wherein the elongation at breakage determined by the tensile test defined in JIS S 2042 is not less than 300%.

6. The acrylic resin glove according to claim 1, wherein both of the tensile load retention and elongation at breakage retention determined by the detergent resistance test defined in JIS S 2042 is not less than 70%.

7. An acrylic resin glove comprising an acrylic resin glove body, and a film of an internal surface treating agent for the acrylic resin glove formed on the internal surface of the acrylic resin glove body, said internal surface treating agent containing an acrylic resin emulsion, and at least one organic filler selected from the group consisting of methacrylic resin micro-particles, polyolefinic resin micro-particles and cellulose beads, each having an average particle diameter within a range from 3 to 10 μm, the content of said organic filler being within a range from 2 to 8% by weight based on the total weight, wherein a film of an internal surface treating agent further containing a crosslinking agent in the acrylic resin emulsion is formed on the internal surface of the acrylic resin glove body.

8. An internal surface treating agent for an acrylic resin glove, comprising an acrylic resin emulsion, and at least one organic filler selected from the group consisting of methacrylic resin micro-particles, polyolefinic resin micro-particles and cellulose each having an average particle diameter within a range from 3 to 10 μm, the content of said organic filler being within a range from 2 to 8% by weight based on the total weight, and further comprising a crosslinking agent.

9. The acrylic resin glove according to claim 2, wherein the acrylic resin emulsion contains a crosslinking agent.

10. The acrylic resin glove according to claim 2, wherein the elongation at breakage determined by the tensile test defined in JIS S 2042 is not less than 300%.

11. The acrylic resin glove according to claim 2, wherein both of the tensile load retention and elongation at breakage retention determined by the detergent resistance test defined in JIS S 2042 is not less than 70%.

* * * * *